United States Patent [19]
Hagen et al.

[11] 3,966,273
[45] June 29, 1976

[54] SYNCHRONIZED AND PRECISION SEQUENCING OF BALL RETAINER RELATIONSHIP TO THE INNER AND OUTER SLIDE MEMBERS

[76] Inventors: Magnus F. Hagen, 3713 Twilight Drive, Fullerton, Calif. 92632; Fred A. Jordan, 14906 Lodosa, Whittier, Calif. 90605

[22] Filed: Sept. 13, 1974

[21] Appl. No.: 505,902

[52] U.S. Cl. .............................. 308/3.8; 308/6 R; 312/345
[51] Int. Cl.² .................................. F16C 29/04
[58] Field of Search ............ 308/3 R, 3.6, 3.8, 6 R; 312/345, 348; 74/110, 229

[56] References Cited
UNITED STATES PATENTS

| | | | |
|---|---|---|---|
| 2,941,410 | 6/1960 | Ota | 74/229 |
| 3,010,328 | 11/1961 | Forey | 74/110 |
| 3,143,895 | 8/1964 | Robie | 74/229 |
| 3,488,097 | 1/1970 | Fall | 308/3.8 |
| 3,679,275 | 7/1972 | Fall et al. | 308/3.8 |
| 3,857,618 | 12/1974 | Hagen et al. | 308/3.8 |

*Primary Examiner*—Frank E. Werner
*Assistant Examiner*—Randolph A. Reese
*Attorney, Agent, or Firm*—J. Carroll Baisch

[57] ABSTRACT

A telescoping or linear motion ball bearing synchronized slide mechanisms having inner and outer slide members held together by ball bearings, the balls being operably disposed in a ball retainer between the inner and outer slide members and means for precisely maintaining the relationship of these parts. This means comprising strips of friction material secured to the inner sides of the inner and outer slide members and extending longitudinally of these slide members. The ball retainer has longitudinally spaced openings with rollers or holders operably mounted to the ball retainer at these openings and a continuous or endless flexible band of friction material is mounted on these rollers and extends longitudinally of the ball retainer. The ends of the band are looped and pass over the rollers so that the longitudinally extending portions of the band between the loops extend on respective opposite sides of the ball retainer in parallel relationship to the respective strips of friction material on the slide members and operably engage or mesh in a random manner the strips of friction material on the respective inner and outer slide members.

20 Claims, 13 Drawing Figures

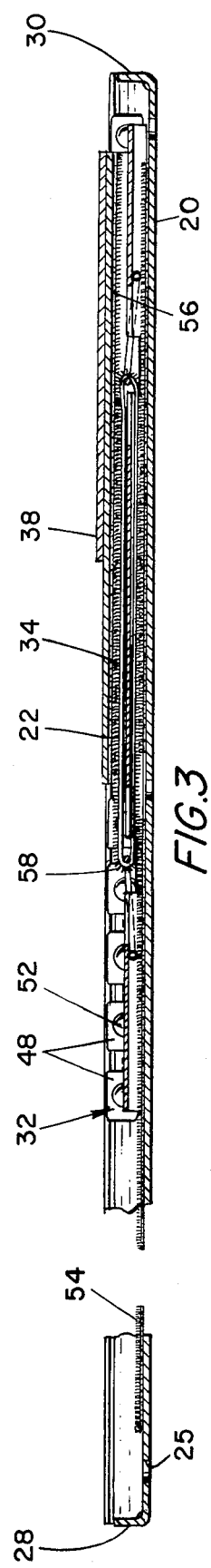
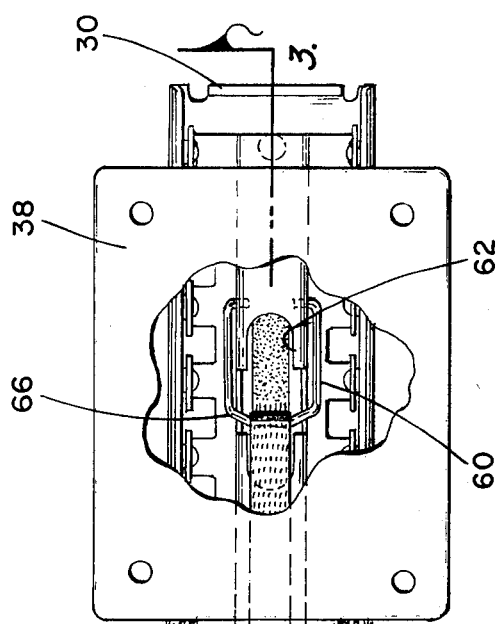
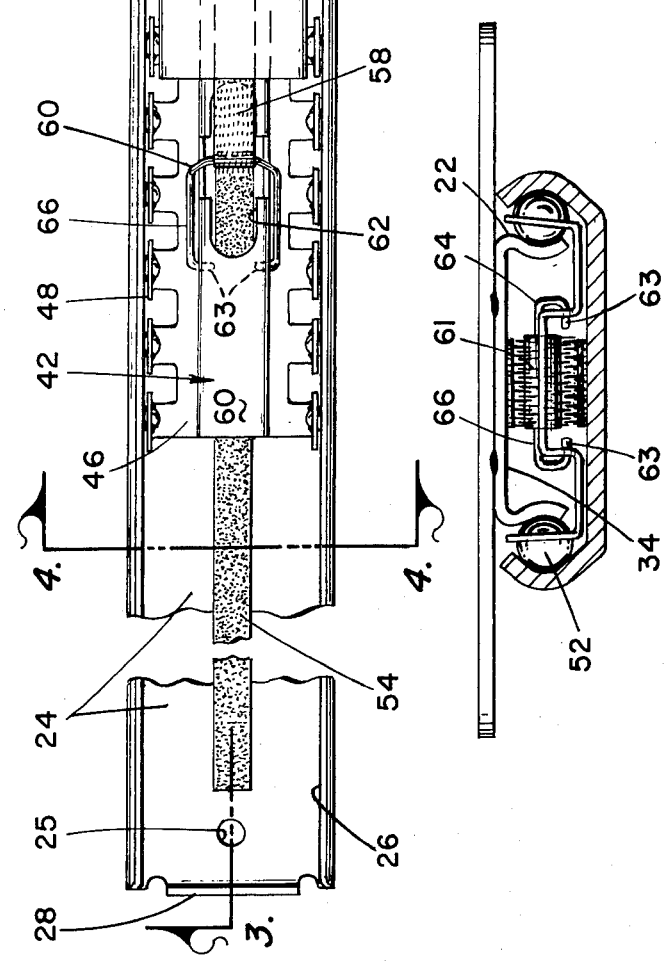

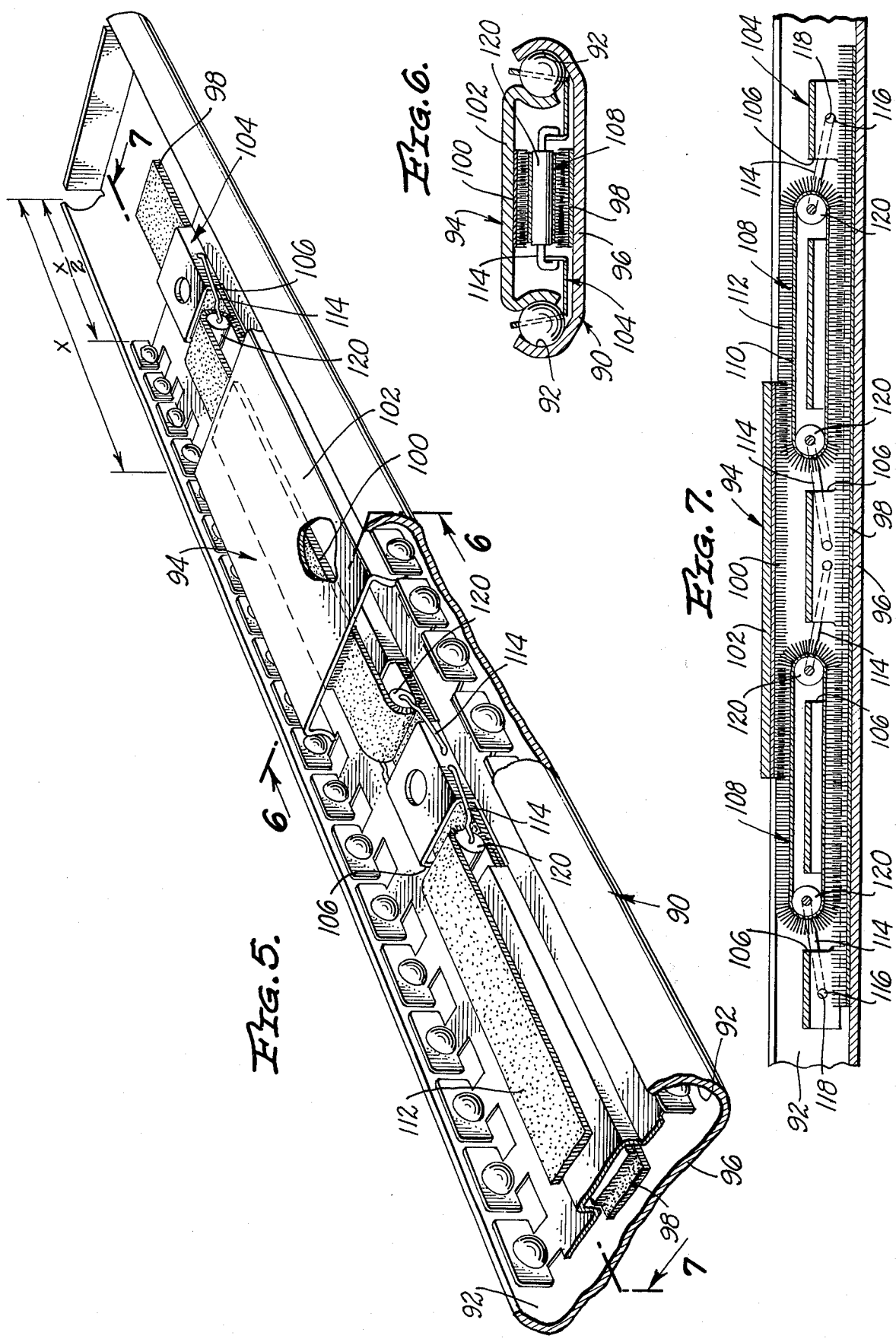

SYNCHRONIZED AND PRECISION SEQUENCING OF BALL RETAINER RELATIONSHIP TO THE INNER AND OUTER SLIDE MEMBERS

This application is related to a copending application by Magnus F. Hagen entitled Method and Means for Operably Interconnecting Movable Parts, Ser. No. 466,782 filed May 3, 1974.

BACKGROUND OF THE INVENTION

1. Field of the Invention

This invention relates generally to telescoping or linear motion ball bearing slide mechanisms and relates more particularly to means for synchronizing the relationship of the ball retainer of the slide mechanism with the telescoping slide members thereof.

2. Description of the Prior Art

Telescoping ball bearing slides such as those covered by the Fred Alex Jordan U.S. Pat. No. 3,205,025, are held together through the formed shapes of the inner and outer slide members by precision ball bearings. The movement of the balls between the two slide members will make a "moving member" telescope or move in linear fashion to the left or to the right of a relationship to the stationary member at double the speed or double the dimensional travel distance as the balls move from a zero point to either left or right. In other words, a point on the moving slide member from a zero position will have traveled twice the distance at any given time as the balls.

If it would be possible to have a precision forming process and fitting of the balls within the inner slide member and the outer slide member so that the circumference of the balls are in contact at the very exact spots of the ball surface relative to the outer member as the opposite wall surface relative to the inner member, the distance of travel of the moving slide member relative to the ball would be exactly one-half.

Since the manufacturing processes and the fitting of balls relative to slide members can never be that exact, a problem of ball skidding occurs. This is due to the fact that circumference engagement points of the ball on the moving member relative to the stationary member engagement points on the circumference of the ball are not exactly in line. Also if there is any tolerance condition from the moving member to the stationary member which causes slide pressure against the balls and brings the relationship of stationary member ball circumference engagement points relative to the moving member ball circumference engagement points into different ball circumference opposing points there will also be the problem of "skidding". Thus the skidding of the balls will affect the exact relationship of travel distance of the moving member relative to ball movement and/or to the ball retainer, which retains the relationship between balls on both ball races at all times.

SUMMARY OF THE INVENTION

The present invention comprises a telescoping ball bearing slide mechanism or linear motion mechanism having telescoping inner and outer slide members and a ball retainer between said members with the ball retainer retaining ball bearings in operative position. The ball bearings are positioned in ball bearing races of the inner and outer members and hold said members together. When installed, one of the slide members is stationary while the other is movable. Usually, the outer slide member is attached to adjacent parts of a cabinet desk or a structure and is stationary while the inner member is attached to the drawer or object and moves with respective movements of said drawer or object. The ball retainer moves with movements of the movable slide member but at half the speed and/or distance thereof.

In other words, a point on the moving slide member will have traveled twice the distance at any given time, as the balls.

In order to prevent skidding of the balls and effect positive synchronization of the parts of the slide mechanism, this invention solves the problem of ball retainer "creeping" by what may be called the synchronization of ball retainer with telescoping slide members or linear movement of slide members.

Basically, the invention resides in an assembly or organization of means for precisely maintaining the relationship of various longitudinally movable parts. This means comprises two layers (or multiples thereof) of strips of friction or synchronization material rigidly mounted on the inner sides of the inner and outer slide members so as to be in substantially parallel planes which are operably spaced apart. At least one of the slide members is movable linearly or longitudinally relative to the other.

A ball retainer with balls is operably mounted between the inner and outer slide members and is provided with longitudinally spaced openings. A continuous flexible band or belt is carried by the ball retainer. Looped ends of the belt or band are disposed adjacent the openings in the ball retainer and are carried on means, such as rollers, over which the looped ends of the belt or band are adapted to move; the portions of the belt or band between the looped ends are at opposite sides of the ball retainer and operably engage or mesh with the bristles or otherwise described of the strips on the inner and outer slide members.

As described above, when the slide mechanisms are installed, one of the slide members, as the outer slide member for example, is stationary while the other slide member, or inner member, is movable. The strip and belt or band arrangement maintains the movable or inner slide member, the outer slide member and the ball retainer in proper and definite synchronized relationship with the ball retainer moving exactly one-half the distance and speed as the movable or inner slide member moves.

We have found that by using a straight bristle type of surface, the bristles will inter-engage each other into a shear condition but will not materially resist any operation of the mechanism. There is a straight movement longitudinally of the bristles in the engagement between the strips and the band and the action is such that the parts can, without any appreciable force, be separated in the opposite direction because of the rolling movement at the looped ends of the band. However, longitudinal or linear movement of the slide members and ball retainer will be prevented by the bristles of the parts of the band intermediate the ends thereof engaging the bristles of the strips on the slide members.

OBJECTS AND ADVANTAGES OF THE INVENTION

The problem of "ball skidding" affects the precision performance of the mechanism. Heretofore, there has been no way to prevent this skidding of balls, except if done in very involved and cumberson gear engagement systems, which again require relatively large space to do it in, not always available in most ball bearing slides presently employed, and it is an object of this invention to solve the ball skidding problem.

It is another object of the invention to provide a telescoping ball bearing or linear motion slide mechanism wherein the relationship between the slide members and the ball retainer are precisely synchronized.

Still another object of the invention is to provide a mechanism of this character having an exact translation of ball movement equalling one-half that of the moving member movement speed and/or distance.

A further object of the invention is to provide a mechanism of this character wherein there is positive control of the relationship between the movable slide member and the ball retainer with the latter moving at one-half the speed and/or distance of said movable slide member.

A still further object of the invention is to provide a mechanism of this character whereby the ball retainer may be utilized to effect movement of the inner slide member relative to the outer slide member in relationship to a force applied to the ball retainer.

It is another object of the invention to provide synchronizing means in ball bearing slide mechanisms using strips having straight bristles attached to the slide members and a traveling band also using straight bristles operably engaging the bristles of the strips.

Still another object of the invention is to provide an arrangement of this character wherein the operation of the bristles of the strips and band requires a minimum force.

A further object of the invention is to provide an arrangement of this character wherein the bristles of the band roll off from the bristles of the strips or roll into engagement with the bristles of the strips.

Another object of the invention is to provide an arrangement of this character wherein there is random intermeshing or engagement of the bristles of the band and of the strips on the slide members.

A still further object of the invention is to eliminate creeping or skidding of the ball retainer.

Still another object of the invention is to provide an arrangement that does not require extreme precision in manufacturing and yet provides the required positive synchronized relationship of the ball retainer versus inner slide member into an exact constant positioning. That is, due to the synchronization provided, it is assured that the ball retainer will be at all times exactly related to the movements of the movable slide members versus the stationary member.

Still another object of the invention is to provide apparatus of this character with which the length of the slide mechanisms is practically unlimited.

The characteristics and advantages of the invention are further sufficiently formed to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings which are for illustrative purposes only:

FIG. 2 is a top plan view of said slide mechanism with parts broken away;

FIG. 3 is a sectional view taken on line 3—3 of FIG. 2;

FIG. 4 is a sectional view taken on line 4—4 of FIG. 2;

FIG. 5 is a partial enlarged perspective view of an alternative arrangement;

FIG. 6 is a sectional view taken on line 6—6 of FIG. 5;

FIG. 7 is a longitudinal sectional view of the arrangement shown in FIGS. 5 and 6;

DESCRIPTION OF THE INVENTION EMBODIED IN A BALL BEARING SLIDE MECHANISM

Figure 1:
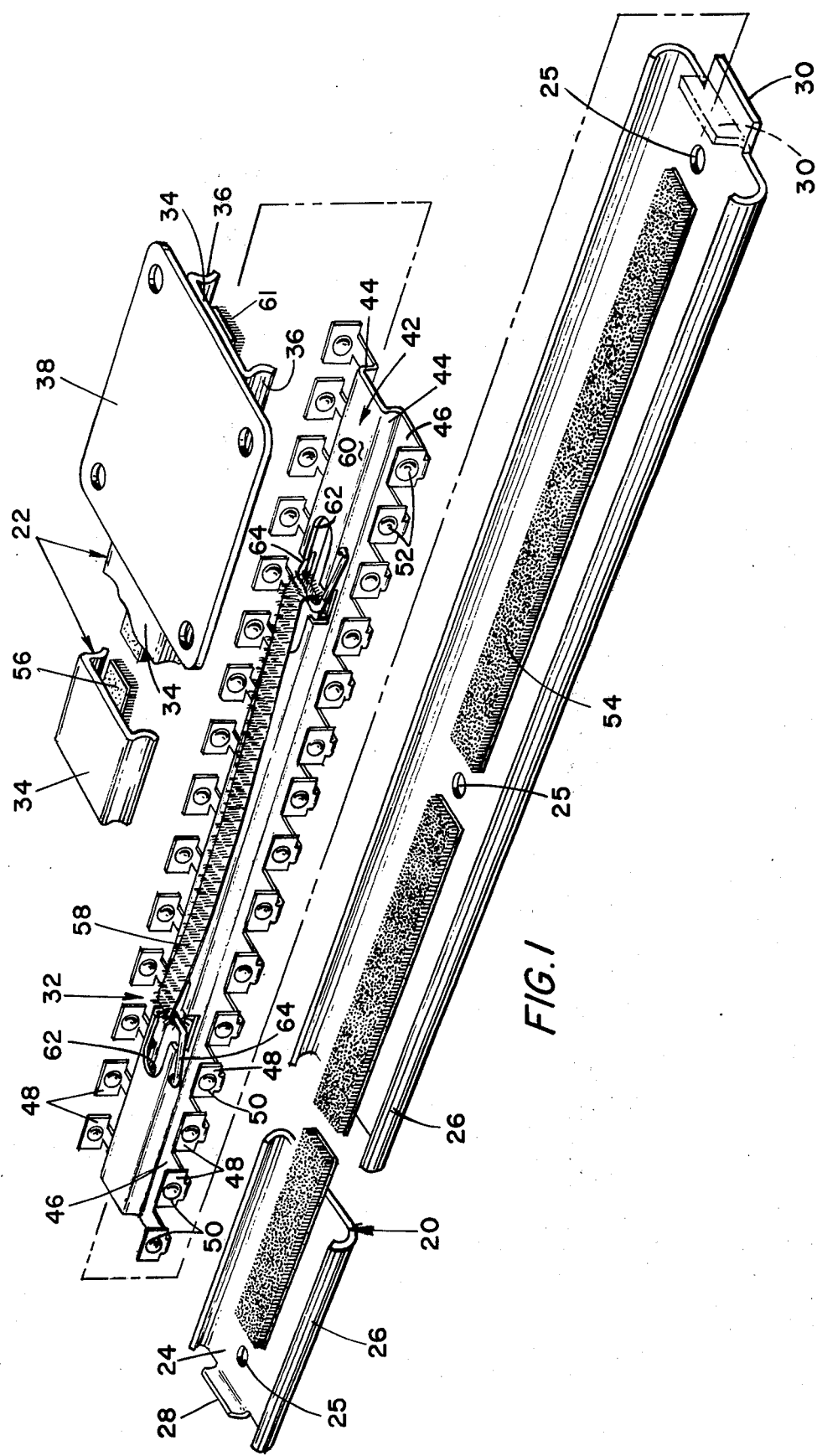
FIG. 1 is an exploded perspective view of a slide mechanism embodying the invention.

Referring more particularly to FIGS. 1–4 inclusive, there is shown a telescoping or linear motion ball bearing slide mechanism embodying the present invention.

These slide mechanisms comprise a pair of slide members, an outer slide member indicated generally at 20, an inner slide member indicated generally at 22, and a ball retainer between said slides. One of the slide members is attached to the side of a drawer like object and the other is attached or secured to the adjacent side of a structure defining the object opening, there being sufficient clearance for the slide between the sides of the object and the adjacent sides or parts of the structure defining the sides of the object opening. Normally, the small or inner slide member is secured to the side of the drawer like object while the larger or outer slide member is secured to the adjacent part or wall of the structure defining the opening. Slide members 20 and 22 are generally channel-shaped and are made with great accuracy.

Outer member 20 has a longitudinally extending center wall 24 which may be termed the bottom of the channel. Along each side edge of the bottom 34 there is an outwardly and laterally extending ball race 26 that is concave and convex in cross section with a concave surface facing inwardly so that said surfaces are oppositely arranged relative to each other and are spaced apart laterally relative to the length of the wall 34.

At one end, the outer member 20 has a flange 28 that is turned laterally at an angle substantially normal to the plane of the bottom wall 34 and in the same direction as the ball races 26. However, the flange 28 extends but part way across the channel so as to leave clearance space at each end for the ball races of the inner slide member when the device is assembled as described hereinafter.

At its other end, the outer slide member 20 has a flange 30 which extends longitudinally from said other end prior to assembly of the mechanism to permit assembly of said mechanism. After assembly, flange 30 is turned upwardly to the dotted line position which is normal to the bottom wall 34 of the outer slide member 20 to act as a stop for the inner slide member 22 and the ball retainer, described hereinafter and indicated generally at 32. Flange 28 serves as a stop for these parts at the other end of the mechanism. Thus, the slide mechanism cannot become separated. Wall 34 is provided with various openings 25 for reception of screws, not shown, whereby said member 20 is secured to a support such as the part of the desk defining the side walls of the drawer opening or the like.

Inner slide member 22 is inverted with respect to outer slide member 20 and has a top wall, indicated at 34', along the longitudinally extending sides or side edges of which are laterally turned ball races 36 which are oppositely arranged and arcuate in cross-section with the concave surfaces arranged oppositely respective adjacent ball races 26 of the outer slide member, said races 36 being spaced from said adjacent races 26.

To facilitate assembly of the slide mechanism, ends of the member 20 are open. The members 20 and 22 have longitudinal movement relative to each other and may be extended and telescoped. A plate 38 is welded or otherwise secured by any suitable means to the outer side of the top wall 34' of the slide member 22 and said plate has holes for screws, not shown, to attach the slide mechanism to a desk drawer or the like.

Slide members 20 and 22 are arranged so that their open sides face each other and disposed between said members, in the space between the parallel walls 34 and 34' is the ball retainer 32.

The ball retainer 32 is also channel-shaped and has a bottom wall comprising a shallow, reversed channel portion 42 which extends longitudinally of the retainer. The side walls 44 of the reversed channel portion 42 connect with side parts 46 of the ball retainer and from the outer edges of which there extend a series of ball retaining arms 48 which are spaced apart longitudinally of the ball retainer 32. The arms at one side of the ball retainer generally are parallel to those at the opposite side thereof, and said arms are at substantially right angles to the side parts 46 and generally parallel to the walls 44 of the reverse channel portion 42. The arms 48 are provided with respective aligned openings 50 for reception of ball bearings 52, said openings 50 being of smaller diameter than the balls 52.

When the ball retainer is operably disposed in the slide mechanism between the inner and outer member, the balls 52 are operably positioned in the races 26 and 36, as best shown in FIGS. 1, 2, 3 and 4. The sides 48 of the ball retainer may exert a slight pressure or tension on the balls against the races to minimize or eliminate retainer vibration and possible noise.

In order to prevent skidding of the balls, and effect positive synchronization of the parts of the slide mechanism and effect maintenance of these parts, strips of friction or synchronization material 54 and 56 are secured to the inner sides of the bottom and top walls 24 and 34' of the respective outer and inner slide members 20 and 22. These strips are secured to said walls by any suitable adhesive such as, for example, an epoxy cement or riveted or any other way. These strips are spaced apart and are in parallel relationship to each other.

The ball retainer 32 is operably disposed between the inner and outer slide members 22 and 20 respectively and operably carries a flexible band or belt 58. The reverse channel portion of the ball retainer has a bottom wall 60 with openings 62 therein which are spaced apart longitudinally of the ball retainer. There is a clip 64 for each of the openings, said clip being generally U-shaped with inturned free ends 63 (best shown in FIGS. 2 and 3), received in openings provided therefor in the side walls 44 of the reverse channel portion. The closed ends of the band or belt 58 are operably disposed on the closed ends 66 of clips so that the portions of the band 58 between the closed ends extend longitudinally of the ball retainer and on opposite sides of the bottom wall 60 of the reversed channel portion.

Band or belt 58 has bristles 61 or the like, secured thereto and said bristles are on the outer side of said band or belt. The bristles on that longitudinally extending portion of the belt on what will be termed the outer side of the ball retainer are in mesh or engagement with the bristles of the strips on the inner side of the top wall 34' of the inner slide member. The bristles at the inner side of the bottom wall 60 of the ball retainer, are in mesh or engagement with the bristles of the strips on the inner side of the outer slide member. This engagement is effective to prevent the relationship of the ball retainer and the inner and outer slide members from getting out of synchronism.

When the slide mechanisms are installed, one of the slide members, the outer slide member for example, is stationary while the other slide member, or inner member, is movable. The strip and belt or band arrangement maintains the movable or inner slide member, the outer slide member and the ball retainer in proper and definite synchronized relationship with the ball retainer moving exactly one-half the distance and speed as the movable or inner slide member moves.

We have found that by using a straight bristle type or like surface, the bristles will inter-engage each other into a shear condition but will not materially resist operation of the mechanism. There is a straight movement longitudinally of the bristles in the engagement between the strips and the band and the action is such that the parts can, without any appreciable force, be separated in the opposite direction because of the rolling movement at the looped ends of the band. However, longitudinal or linear movement of the slide members and ball retainer will be prevented by the engagement or meshing of the bristles of the belt between the looped ends thereof with the bristles of the strips of the outer and inner slide members.

FIGS. 5, 6 and 7

FIG. 5 shows an alternative arrangement schematically, wherein there is an outer slide member indicated generally at 90 along each side of which is a ball race 92 similar to the ball race 26, and above described in connection with the arrangement shown in FIGS. 1 – 4 inclusive.

There is also an inner slide member indicated generally at 94 and having ball races along the sides thereof similar to the ball races 36 in the arrangement shown and described in FIGS. 1 – 4 inclusive. Outer slide member 90 has a bottom wall 96 on the inner side of which extends a strip of friction material 98 while the inner slide member has a strip of friction material 100 on the inner side of a top wall 102 thereof. These strips of friction material are secured to the inner sides of said respective bottom and top walls of the outer and inner slide members and while this material may be of any suitable character, it is shown as comprising a base strip having a plurality of bristles over the exposed surface thereof. These strips of material are of the same character as those described above in connection with the arrangement of FIGS. 1 – 4.

Between the outer and inner members, is a ball retainer indicated generally at 104 and of similar construction and configuration to the ball retainer hereandabove described except that the bottom wall of reversed channel portion has a plurality of openings therethrough as indicated at 106. There is a flexible band indicated generally at 108 of friction material for each of the openings 106 and since these bands are of similar character and construction and similarly mounted to the ball retainer, a description of one need only be made. The band 108 has a backing 110 of any suitable material and the outer surface of said band is provided with bristles 112. At each end of the opening 106, there is a clip 114 of generally U-shaped. The free ends 116 of the clip are inturned toward each other and are received in respective openings 118 in side walls of the reversed channel portion of the ball retainer. Thus, the clips are pivotally mounted to the ball retainer in reverse channel position. Rollers 120 are rotatably mounted on the closed ends of the clips and the band is mounted on said rollers so that the ends of the band pass over the rollers and have a rolling movement so that when the mechanism is operated and the parts move relative to each other, the bristles at the ends of the band roll into and out of engagement with the bristles of the outer and inner slide members. The engagement of meshing of the bristles of the band with the bristles of the strips of the inner and outer slide members is a random engagement and the portions of the band between the rollers have a firm and positive engagement with the bristles of the strips of the outer and inner slide members.

The arrangement shown in FIGS. 5, 6 and 7 has a plurality of belts for the ball retainer. There is an overlapping of the strips of the inner and outer slide members relative to the belts or bands. This is an arrangement that may be of advantage in some situations as in long slides and the like, it also assures a most precise synchronization relationship with zero ball skidding.

In FIGS. 8 through 13, there are shown a number of different types of friction material adapted for use in telescoping ball bearing slides. These are just a few of the arrangements that may be used.

Figure 8:
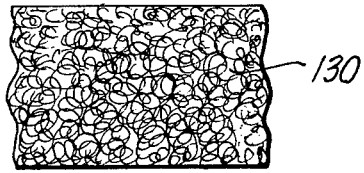
FIG. 8 is a top plan view of a fragment of an alternative friction material, this alternative friction material being of resilient foam or similar material.

In FIG. 8, there is shown foam material 130 with rather large pores.

Figure 9:
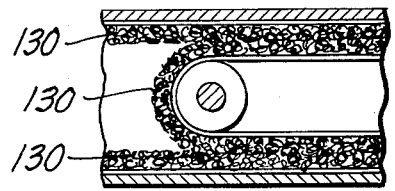
FIG. 9 is a fragmentary schematic side elevational view of the mechanism using the friction material of FIG. 8.

In FIG. 9, the strips for the slide members have the foam material 130 secured to the bottoms of the inner and outer slide members and the same kind of foam material is shown for the band of the ball retainer. The foam material of the band has sufficient compressive engagement with the foam material of the strips to prevent slipping of the ball retainer relative to the outer and inner slide members.

Figure 10:
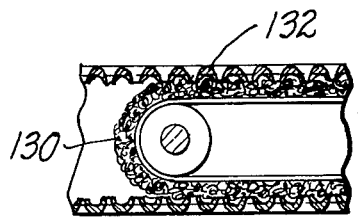
FIGS. 10, 11, 12 and 13, are similar views of alternative arrangements of the friction, random intermeshing or underengagement material.

In FIG. 10, there are pressed-out parts 132 of the bottoms of the inner and outer slide members with foam material 130 for the band or belt 134.

Figure 11:
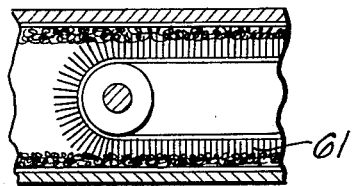

In FIG. 11, the strips for the slide members are of foam material, while the band or belt of the ball retainer has the bristles.

Figure 12:
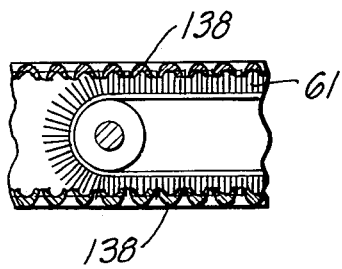

In FIG. 12, the pressed-out parts 138 of the slide members, face inwardly and the belt or band of the ball retainer has bristles.

Figure 13:
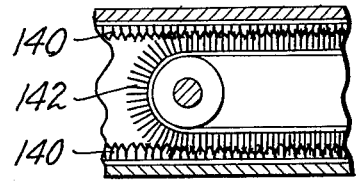

In FIG. 13, there is shown an arrangement wherein the strips for the slide members have loops or hooks 140 and the belt or band of the ball retainer has bristles 142.

It is to be understood that in such arrangements as those shown in FIGS. 10 and 12, the press-out parts may be separate strips of metal that are secured to the bottoms of the slide members by any suitable well-known means, such as epoxy, adhesives, rivets or any other suitable well-known means.

SUMMARY

In summary, the belt or band has ends that are looped over holding means carried by the ball retainer and the parts of the band intermediate the ends are in random and locked engagement with the strips of friction material on the slide members. In other words, the surfaces of the strips of the slide members are always in random contact with the intermediate portions of the belt or band so that there is an exact synchronization effect.

There are large and elongated surface areas of the friction material of the slide members and of the belt or band that are always in firm contact and will 100 percent prevent slippage.

Further, a looped tank-track-type section which may be of any type of material representing the bristle approach, rotating through the ball retainer which will engage with the same type of bristle material or different material as described in the Magnus F. Hagen application for Method and Means for Operably Interconnecting Movable Parts, Ser. No. 466,782, filed May 3, 1974.

It should also be made in point that the slide members maybe produced with a sort of spiked surface and have a steel wool type loop or belt run around the belt retainer so that there is a total steel engagement system.

Another arrangement would be to have a very thin steel or aluminum type strip which would be perforated by multiple holes and the perforations extending upward, again representing some kind of spikes and have these strips spot-welded to the surface or rivet end or in any other way adhered to the inner and outer members. The same kind of metal could also become a loop running around the ball retainer and engaging into the adjacent strips of material.

This mechanism can be applied to numerous applications where controlled movement relationships are required, such as the application of this mechanism having typewriter carriage movement from left to right and return movements, or printer readout mechanisms for back and forth motion of print heads, etc.

It could also be applied to flying disc heads on disc drives where a flying disc head will move in a back and forth manner and rapidly, and related applications.

The numerous possible applications include any type of linear control movement and, if necessary, through build-up sections, it can give a one to four type of relationship movements.

It is also possible to drive the ball retainer itself which only travels half the speed and distance of the inner section. In other words, if something fastened to the inner member section should be transported to a certain point, the actual drive mechanism would be coupled to the ball retainer which would only have to travel half the distance and/or speed. The system will assure the synchronized double speed and distance of the ball retainer.

Further, multiple sections of slides could be coupled together with the relationships as given hereinabove, and can affect many different applications with a thoroughly controlled synchronized ball retainer relationship. With this new arrangement, very wide tolerances are possible and still have a very positive engagement thus making many applications possible.

Because random type of meshing or inter-engagement of the friction material, very precise and effective operation is possible and costs are greatly reduced. Even if parts of the strip or belt become worn or damaged, this will still not affect precise performance of the invention. Also, should foreign matter (dirt, etc.) get into some areas of the slide, it will not damage or destroy synchronization movement.

Another advantage is that slides embodying the present invention can now function vertically without balls with the retainer falling downward, a function mostly impossible heretofor, due to gravity. The slide mechanism will only move the ball retainer in the exact relationship.

The invention is of use in synchro slides for numerous computer and copy machine applications, as for example, where synchronized movements are important to X-Y scan areas in precise manner, to move mirror reflectors, to transport paper or film relative to other objects. Also, mechanism is effective for linear tracking and carrying of print-head systems as applied to typewriter-like applications, including typewriters, manual and electronic; teletype machines; Braille typewriters; facsimile transmissions; computer printout machines and the like.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and we do not wish to be restricted to the specific form shown or uses mentioned except as defined in the accompanying claims.

We claim:

1. Telescoping linear motion synchronized ball bearing slides, comprising:
    an outer slide member having a longitudinally extended bottom wall;
    a strip of material having a multiplicity of protrusions thereon secured to the inner side of the bottom wall of said outer slide member and extending longitudinally thereof;
    an inner slide member having a longitudinally extending top wall parallel to the bottom wall of the outer slide member;
    a strip of material having a multiplicity of protrusions thereon secured to the inner side of the top wall of the inner slide member, said strip of material extending longitudinally of said inner slide member;
    ball races along the side edges of the outer and inner slide members, the ball races along adjacent side edges of the respective slide members being operably positioned to receive ball bearings therein;
    ball bearings in said races for retaining said members together for longitudinal movement relative to each other;
    a ball retainer longitudinally movable between said slide members and having parts for operably retaining the balls in longitudinally spaced relationship in said ball races, said ball retainer having a longitudinally extending part parallel to the bottom and top walls of said outer and inner slide members;
    an endless band of flexible material having a multiplicity of protrusions thereon;
    band mounting means spaced apart on the ball retainer on which the band is operably mounted and over which ends of the band pass with a rolling movement, said band including planar portions at opposite sides of the ball retainer between said mounting means at all times being in random and meshing positive interlocking engagement with the adjacent strips of the slide members to preclude slippage therebetween.

2. The invention defined by claim 1, wherein the friction material comprises bristles for random positive interlockingly meshing.

3. The invention defined by claim 2, wherein the bristles are straight.

4. The invention defined by claim 2, wherein the bristles of the band randomly engage and positively meshingly interlock with the bristles of the strip.

5. The invention defined by claim 4, wherein the bristles of the band are adapted to engage the bristles of the strips and to disengage said bristles as the ball retainer and one of the slide members move longitudinally.

6. The invention defined by claim 4, wherein the material of the rotatable band at the ends thereof has rolling engagement and disengagement with the material of the strips, and the planar portions of said band randomly and meshingly positively interlock with said strips and the protrusions thereon.

7. The invention defined by claim 6, wherein the material of the longitudinally extending planar parts of the band between the ends thereof and the protrusions thereon have random and positive meshing and interlocking engagement with the material of the adjacent strips and the protrusions thereon.

8. The invention defined by claim 1, wherein the material of the strips and band comprises porous foam material.

9. The invention defined by claim 1, wherein the strips have a plurality of parts pressed outwardly from one surface and with perforations at the free ends of said pressed out parts, the pressed out parts of said strips facing each other; and the material of the band comprises porous foam material.

10. The invention defined by claim 1, wherein the strips have a plurality of parts pressed outwardly from one surface and with perforations at the free ends of said pressed out parts, the pressed out parts of said strips facing each other; and the material of said band comprises bristles.

11. The invention defined by claim 1, wherein the material of the strips and of the band comprises porous foam material.

12. The invention defined by claim 1, wherein the material of the strips comprises porous foam material and the material of the band comprises bristles.

13. The invention defined by claim 1, wherein the foam material of the strips comprises bristles having separated ends; and the material of the band comprises bristles.

14. The invention defined by claim 1, wherein at least some of the material has perforations therein.

15. The invention defined by claim 1, wherein said material is of flexible metal and has perforations therein.

16. Synchronized ball retainers for telescoping or linear motion ball bearing slide mechanism comprising:
    an outer slide member of generally channel-shape and having a longitudinally extending bottom wall and oppositely arranged ball races along the side edges of the bottom wall, said ball races being concave in cross section and facing each other;

an inner channel-shaped slide member having a longitudinally extending top wall and oppositely facing ball races along the side edges thereof, said ball races being concave in cross section and facing outwardly, the inner slide member being operably disposed within the outer slide member;

ball bearings disposed in adjacent channels of the respective outer and inner slide members;

a ball retainer operably disposed between the outer and inner slide members for retaining the balls operably in the channels, said ball retainer having a longitudinally extending bottom wall with longitudinally spaced openings therein;

a strip of material having a multiplicity of protrusions thereon secured to the inner side of the bottom wall of the outer slide member and extending longitudinally thereof;

a strip of material having a multiplicity of protrusions thereon secured to the inner side of the top wall of the inner slide member and extending longitudinally thereof;

hand support and guide means;

a continuous flexible band of material having a multiplicity of protrusions thereon disposed between the slide members and trained over said support and guide means and extending parallel to said strips; said band support and guide means being operably connected to the bottom wall of said ball retainer, said band being carried by said means which have parts over which said band is trained, the band being adapted to pass through said openings in the bottom wall of the ball retainer so that a portion of the band is planarly disposed at the inner side of the bottom wall of the ball retainer and the opposite side of said band is planarly disposed between the outer sides of the top wall of the inner slide member and the bottom wall of the ball retainer with said planar band portion adjacent the strip on the bottom wall of the ball retainer meshingly engaging said strip while the planar portion of the band at the outer side of the ball retainer meshingly engages the strip on the bottom wall of the outer slide member, the material of the band rolling into and out of random positive interlocking engagement with the material of at least one of the strips and the protrusions thereof on the slide members to preclude slippage therebetween.

17. The invention defined by claim 16, wherein said band support and guide means includes rotatable rollers over which said band is trained.

18. The invention defined by claim 17, wherein the bristles of that part of the band carried by one of the rollers rollingly engage and disengage the bristles of the strip of at least one of the slide members.

19. The invention defined by claim 16, wherein the strips and band include bristles.

20. The invention defined by claim 16 wherein the portions of the band rolling over said band support and guide means are adapted to operably engage and disengage the strips on the slide members.

* * * * *